United States Patent
Banjyo et al.

(10) Patent No.: US 6,402,497 B1
(45) Date of Patent: *Jun. 11, 2002

(54) MOLD CLAMPING DEVICE WITH IMPROVED CLAMPING FORCE TRANSMISSION MECHANISM

(76) Inventors: Toshinobu Banjyo; Masataka Takehara; Shinichi Hasegawa; Haruo Yoshida, all of c/o Mitsubishi Denki Kabushiki Kaisha Fukuoka Seisakusho, 1-1, Imajuku-higashi 1-chome, Nishi-ku, Fukuoka-shi, Fukuoka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/308,963

(22) Filed: Sep. 20, 1994

Related U.S. Application Data

(63) Continuation of application No. 08/035,693, filed on Mar. 23, 1993, now abandoned.

(30) Foreign Application Priority Data

Mar. 24, 1992 (JP) ............................................. 4-066114

(51) Int. Cl.$^7$ ............................................. B29C 45/66
(52) U.S. Cl. ................... 425/173; 100/258 A; 100/287; 425/190; 425/451.6; 425/593; 425/595
(58) Field of Search ................................ 425/169, 171, 425/173, 190, 451.5, 451.6, 451.9, 592, 593, 595; 100/258 A, 258 R, 281, 286, 287

(56) References Cited

U.S. PATENT DOCUMENTS

| | | | | |
|---|---|---|---|---|
| 2,815,709 A | * | 12/1957 | Puhlmann | 100/258 A |
| 3,195,449 A | * | 7/1965 | Jureit | 100/258 R |
| 3,245,122 A | * | 4/1966 | Maurer | 425/593 |
| 3,840,313 A | * | 10/1974 | Grundmann et al. | 425/171 |
| 4,345,890 A | * | 8/1982 | Hemmi et al. | 425/171 |
| 4,360,335 A | * | 11/1982 | West | 425/451.5 |
| 4,685,876 A | * | 8/1987 | Loscei | 425/173 |
| 4,755,124 A | * | 7/1988 | Tanaka et al. | 425/593 |
| 5,164,209 A | * | 11/1992 | Goto | 425/451.6 |

FOREIGN PATENT DOCUMENTS

| | | |
|---|---|---|
| JP | 60-125620 | 7/1985 |
| JP | 61-185936 | 8/1986 |
| JP | 61-283518 | 12/1986 |

* cited by examiner

*Primary Examiner*—James P. Mackey

(57) ABSTRACT

The mold clamping device with improved transmission mechanism includes: a middle platen 2 fixedly supported by a support base 1 and carrying the lower metallic mold 6; and front tie-bars 3a extending slidably therethrough. A movable platen 4 carrying the upper metallic mold 7 is secured to the top ends of the front tie-bars 3a. The horizontal connecting bar members 5a and 5b connect the bottom ends of the front and the rear tie-bars 3a and 3b. The middle platen 2 and the horizontal connecting bar members 5a and 5b are operatively coupled by means of the pantograph mechanism consisting of flat bar-shaped links 15a and 15b, whose front and rear joints are pinned to annular links 16a and 16b engaging with a left-and-right-handed ball thread member 17 driven by a driving source.

14 Claims, 4 Drawing Sheets

MOLD CLAMPING DEVICE WITH IMPROVED CLAMPING FORCE TRANSMISSION MECHANISM

This is a continuation of Application No. 08/035,693 filed Mar. 23, 1993, now abandoned.

BACKGROUND OF THE INVENTION

This invention relates to mold clamping devices used for sealing semiconductor elements with resin.

FIG. 4 is a side view of a conventional mold clamping device. An upper metallic mold 31 secured to an upper platen 32 opposes a lower metallic mold 34 secured to a movable plated 33. The movable platen 33 is slidably supported on tie-bars 36a and 36b, which are fixed to the upper platen 32 and the lower platen 35 by means of the tie-bar fixing nuts 39a through 39h. A driving mechanism 37 drives a ball thread 38 via a gear train 40 and a ball thread support 41 accommodated within the lower platen 35, and thereby vertically translates the movable platen 33 slidably supported on the tie bars 36a and 36b.

The operation of the mold clamping device of FIG. 4 is as follows. The ball thread 38 is driven and rotated by the driving mechanism 37 through the gear train 40 and the ball thread support 41, thereby lifting the movable platen 33 and the lower metallic mold 34. After the lower metallic mold 34 contacts upon the upper metallic mold 31, the tie-bars 36a and 36b are extended by the force exerted from the lower metallic mold 34. The lower metallic mold 34 is stopped at a position where a predetermined clamping force is developed between the upper metallic mold 31 and the lower metallic mold 34.

Then, the semiconductor element accommodated within the cavity formed between the upper metallic mold 31 and the lower metallic mold 34 is sealed with resin. After the resin sealing is completed, the ball thread 38 is rotated in the reverse direction, such that the movable platen 33 and the lower metallic mold 34 are lowered to the original position.

The above conventional mold clamping device, however, suffers the following disadvantage. During the clamping operation the reaction from the upper metallic mold 31 of the clamping force acting on the lower metallic mold 34 is concentrated at the ball thread support 41, and, as a result, the ball thread support is prone to fail.

SUMMARY OF THE INVENTION

It is therefore an object of this invention to provide a mold clamping device by which the reaction of the clamping force from the upper metallic mold 31 acting on the transmission mechanism may be dispersed, and hence the occurrences of failures are reduced and the reliability of the device is enhanced.

A further object of this invention is to provide a mold clamping device by which the clamping force can be measured accurately and the mold face bearing between the upper and the lower metallic molds (i.e., the distribution of the contact pressure between the contacting faces of the upper and lower metallic molds) can be adjusted easily.

The first object is accomplished in accordance with the principle of this invention by a mold clamping device for sealing a semiconductor element with a resin, which comprises a support base; a middle platen fixedly supported by the support base; a lower metallic mold fixedly secured upon an upper surface of the middle platen; a plurality of tie-bars vertically extending through and slidably supported by the middle platen; a movable platen fixedly secured to top end portions of the tie-bars; an upper metallic mold fixedly secured upon a lower surface of the movable platen to oppose the lower metallic mold, the lower metallic mold and the upper metallic mold defining a cavity for accommodating a semiconductor element during a resin molding and sealing process; a horizontal connecting bar member connecting lower ends of at least two of the tie-bars; a quadrilateral linkage mechanism having a form of a collapsible rhombus lying on a vertical plane, the rhombus exhibiting two vertices lying on a vertical line and the other two vertices lying on a horizontal line, wherein a top and a bottom vertex of the rhombus lying on the vertical line are rotatably coupled to the middle platen and the horizontal connecting bar member, respectively; a first and a second annular link rotatably coupled to the two vertices of the rhombus of the quadrilateral linkage mechanism, respectively, the first and a second annular link each having an inner thread formed on an inner surface thereof; a rod-shaped threaded member having a left handed first thread and a right-handed second outer thread formed at an outer side surface thereof, the first and second threads engaging with the inner thread of the first and second annular links, respectively, whereby a rotation of the rod-shaped threaded member in a first direction drives the annular links toward each other upon the rod-shaped threaded member, and a rotation of the rod-shaped threaded member in a second direction opposite to the first direction drives the annular links away from each other upon the rod-shaped threaded member; and a driving means for driving the rod-shaped threaded member selectively in the first and second direction, thereby lowering the upper metallic mold toward the lower metallic mold and raising the upper metallic mold away from the lower metallic mold, respectively, a driving force being transmitted from the driving means to the upper metallic mold through the rod-shaped threaded member, the annular links, the quadrilateral linkage mechanism, the horizontal connecting bar member, the tie-bars, and the movable platen.

Preferably, the annular links engage with the rod-shaped threaded member via ball threads formed upon the outer side surface thereof.

The second object is accomplished by the provision of: linear scales disposed near and parallel to the tie-bars, wherein elongations of the tie-bars indicative of clamping forces upon contact of the lower metallic mold with the upper metallic mold are measured by means of the linear scales. Further, the second object is accomplished by the provision of: a first and a second tie-bar fixing nut engaging with an upper end portion of a first and a second of the tie-bars, respectively, and supporting the movable platen at respective vertical levels, wherein the respective vertical levels of the movable platen are adjusted by turning the tie-bar fixing nuts; a first and a second pulley fixedly secured to the first and second tie-bars, respectively, the first and second pulleys having distinct numbers of teeth formed on outer side surfaces thereof; and timing belt span on the first and second pulleys, the timing belt having teeth formed upon an inner surface thereof engaging with the teeth formed on outer side surfaces of the first and second pulleys, such that the first and second pulleys are turned together by means of the timing belt, to adjust a tilting of the movable platen, thereby adjusting a mold face bearing between the lower metallic mold and the upper metallic mold.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
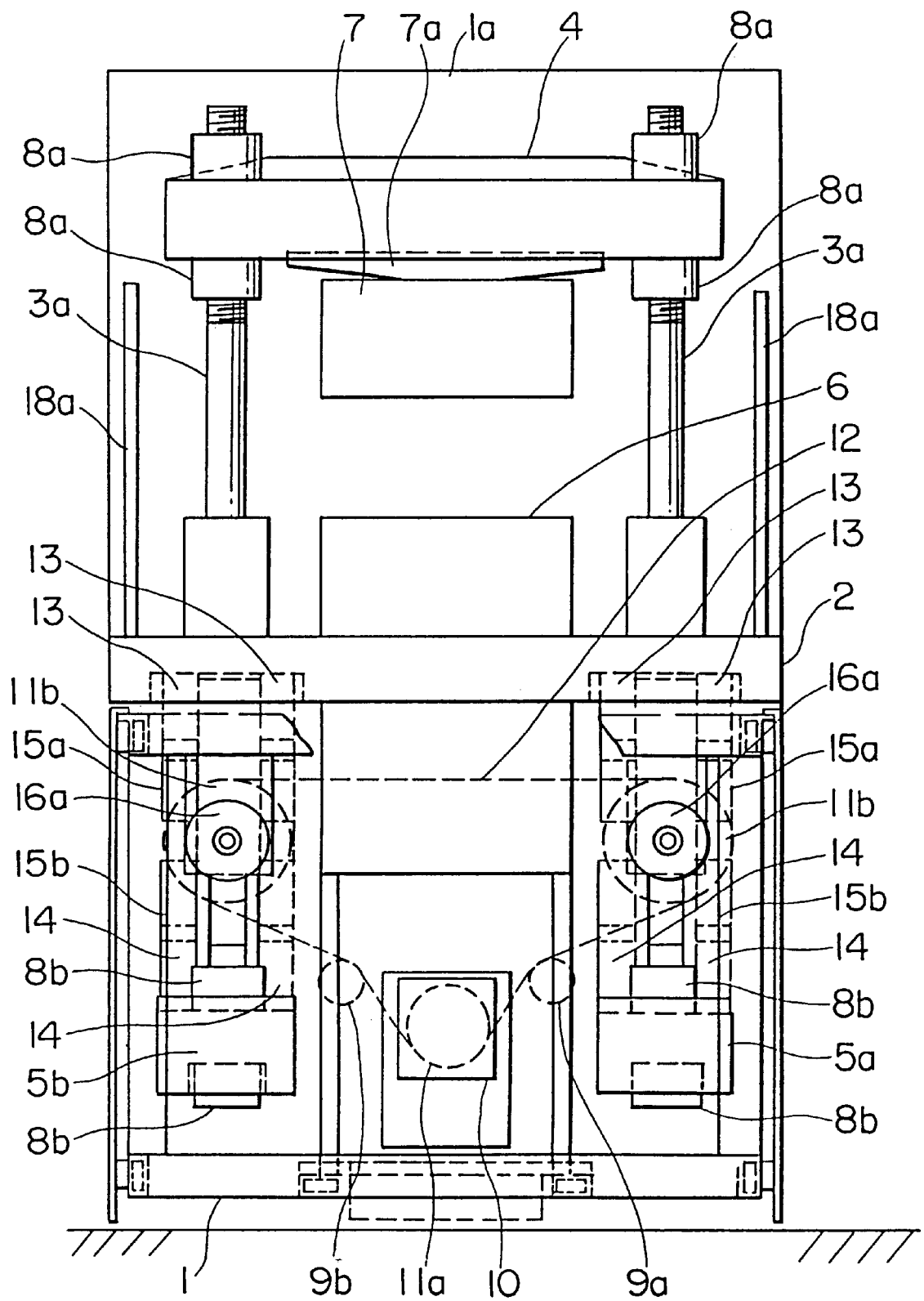
FIG. 1 is a front view of a mold clamping device according to this invention.
Figure 2:
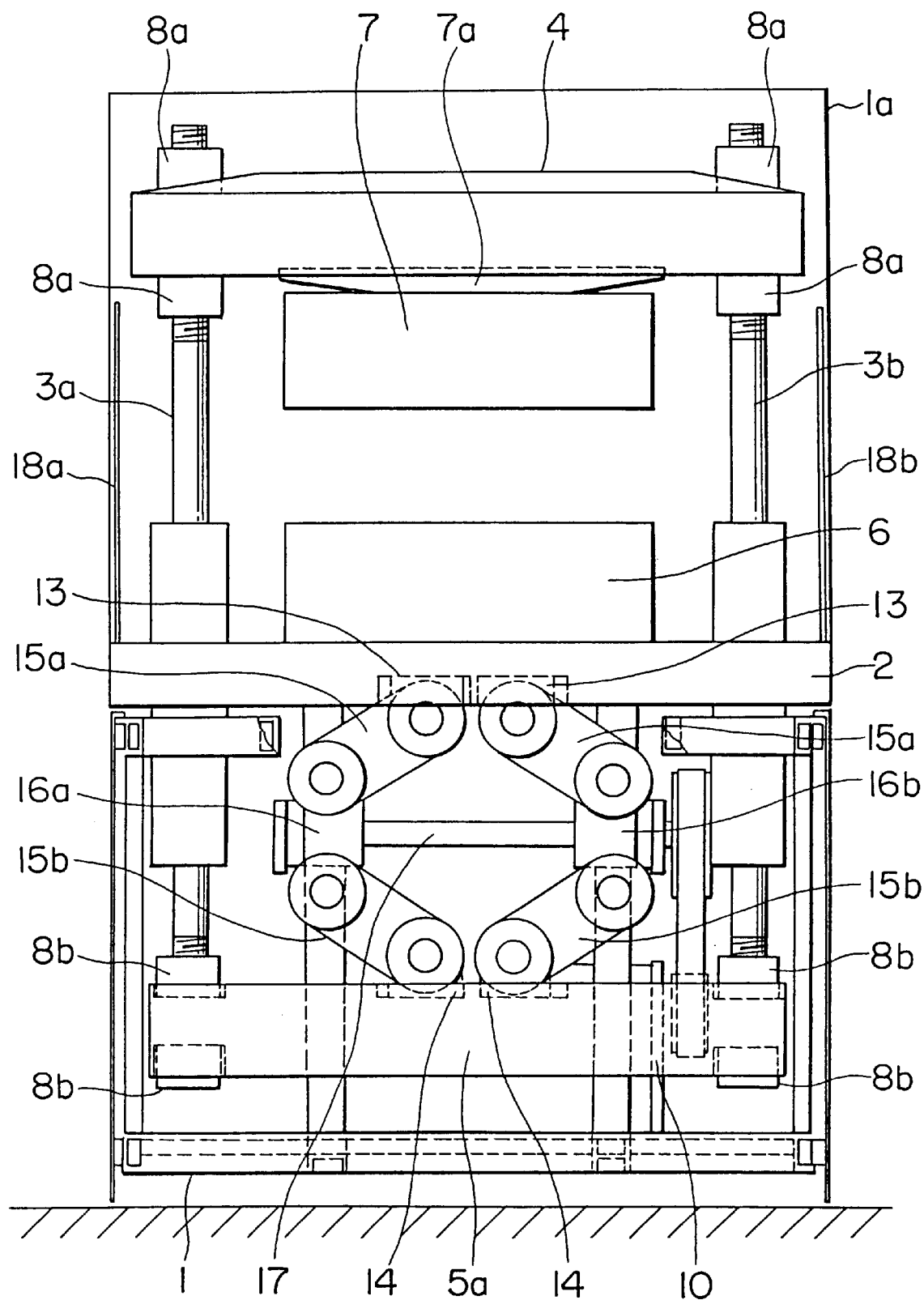
FIG. 2 is a side view of the mold clamping device of FIG. 1 as viewed from the right side of FIG. 1.

FIG. 1 is a front view of a mold clamping device according to this invention. FIG. 2 is a side view of the mold clamping device of FIG. 1 as viewed from the right side of FIG. 1. In FIGS. 1 and 2, some of the parts of the mold clamping device are omitted, such that the essential structure may be shown clearly.

The mold clamping device is mounted on a support base 1 and is covered with an outer covering 1a. A middle platen 2 is fixedly secured to the support base 1 by means of vertical connecting rods, and upon the middle platen 2 is fixedly mounted a lower metallic mold 6. Four tie-bars, two front tie-bars 3a and two rear tie bars 3b, slidably extend through the middle platen 2 at the four corners thereof. A movable platen 4 secured to the top ends of the tie-bars 3a and 3b by means of the tie-bar fixing nuts 8a is translated vertically together with an upper metallic mold 7 fixedly mounted on the lower surface thereof. In a variation of the preferred embodiment, as shown in FIGS. 1 and 2, member 7a is disposed between the upper mold 7 and the movable platen 4, and is shaped so that the thickness in the vertical direction is greater at the center than at the left and right edges.

The right horizontal connecting bar member 5a of the linkage mechanism, extending from front to rear of the mold clamping device at the right side thereof, is secured at the front and the rear end thereof to the bottom ends of the right front and rear tie-bars 3a and 3b by means of tie-bar fixing nuts 8b. Similarly, the left horizontal connecting bar member 5b of the linkage mechanism, extending from front to rear of the mold clamping device at the left side thereof, is secured at the front and the rear end thereof to the bottom ends of the left front and rear tie-bars 3a and 3b by means of tie-bar fixing nuts 8b. The right and the left horizontal connecting bar members 5a and 5b are driven by respective linkage mechanisms as described below, and thereby raise and lower the movable platen 4 and the upper metallic mold 7 through the tie-bars 3a and 3b. Since the right and left linkage mechanisms have an identical structure, the linkage mechanism at the right side of FIG. 1 is described by referring primarily to FIG. 2.

A quadrilateral linkage mechanism having the form of a collapsible rhombus consisting of two upper sides 15a and two lower sides 15b is rotatably secured to the middle platen 2 and the right horizontal connecting bar member 5a at the upper and the lower vertices thereof, and thereby operatively connects the middle platen 2 with the right horizontal connecting bar member 5a. More specifically, the upper ends of the upper bar-shaped links 15a are rotatably secured to the middle platen 2 via respective upper link support members 13, and the lower ends of the lower bar-shaped links 15b are rotatably secured to the right horizontal connecting bar member 5a via respective lower link support members 14. Further, the lower ends of the front and the rear upper bar-shaped links 15a are rotatably supported on the front annular link 16a and the rear annular link 16b, respectively. Similarly, the upper ends of the front and the rear lower bar-shaped links 15b are rotatably supported on the front annular link 16a and the rear annular link 16b, respectively. It is noted that each side of the rhombus consists of a pair of parallel running flat bar-shaped links 15a or 15b (see FIG. 1). Although the adjacent sides of the rhombus are not directly pinned with each other at the vertices thereof, the plane linkage mechanism consisting of the upper bar-shaped links 15a and the lower bar-shaped links 15b is essentially a pantograph mechanism having the form of a collapsible rhombus. The pantograph mechanism including all the variations thereof apparent to those skilled in the art is referred in this specification by the generic term quadrilateral linkage mechanism having the form of a collapsible rhombus.

The front annular link 16a and the rear annular link 16b each have an inner thread formed on the inner side surface thereof, and the front annular link 16a and the rear annular link 16b engage with the ball threads formed upon a rod-shaped threaded member 17. One embodiment of the present invention, shown in FIG. 2, allows the threaded member 17 to be substantially contained within the clamping device, due to the configuration of the linkage mechanism. Namely, the front annular link 16a and the rear annular link 16b engage at the inner threads thereof with respective threads formed upon the outer side surface of the rod-shaped threaded member 17 at the front and the rear half portions thereof, wherein the rod-shaped threaded member 17 and the annular link 16a or 16b engage with each other through balls confined between the grooves of the engaging threads. The ball threads are well known to those skilled in the art. The directions of the threads at the front and the rear half of the rod-shaped threaded member 17 engaging with the front annular link 16a and the rear annular link 16b, respectively, are opposite to each other (e.g., left handed upon the front half and right handed upon the rear half). Thus, upon rotation of the left-and-right-handed ball thread member 17, the front annular link 16a and the rear annular link 16b are translated simultaneously inward toward each other, or simultaneously outward from each other, according as the left-and-right-handed ball thread member 17 is rotated in the first or the second direction. Consequently, the quadrilateral linkage mechanism consisting of the flat bar-shaped links 15a or 15b is deformed accompanying the rotation of the left-and-right-handed ball thread member 17. Since the middle platen 2 is fixedly secured to the support base 1, the linkage mechanism thereby translates the right horizontal connecting bar member 5a vertically upward (when the front annular link 16a and the rear annular link 16b are driven outward) or downward (when the front annular link 16a and the rear annular link 16b are driven inward).

The linkage mechanism at the left side of the mold clamping device has a structure similar to that of the linkage mechanism at the right side. Upon the respective rear ends of the right and left left-and-right-handed threaded ball threads 17 are fixedly secured respective timing pulleys 11b.

Further, a timing belt 12 is spanned upon, and engages with, the timing pulleys 11b fixed to the ball threads 17 and a timing pulley 11a fixed to the driving source 10. Thus, the right and the left left-and-right-handed threaded ball threads 17 are driven by the driving source 10 via the timing pulley 11a, the timing belt 12 and the timing pulleys 11b. The timing pulley 11a fixed to the driving source 10 exhibits a number of teeth different from the number of teeth of the timing pulleys 11b, such that the rotation of driving source 10 is decelerate before transmitted to the ball threads 17. Further, a pair of idlers 9a and 9b bearing on the timing belt 12 are translated upward when the horizontal connecting bar members 5a and 5b goes down, and downward when the horizontal connecting bar members 5a and 5b goes up, such that a constant tension of the timing belt 12 is maintained.

Four linear scales, the two front linear scales 18a and the two rear linear scales 18b, are disposed parallel and near to the two respective tie-bars 3a and 3b, respectively. The elongations of the respective tie-bars 3a and 3b are measured by means of the linear scales 18a and 18b.

The method of operation of the mold clamping device of FIGS. 1 and 2 is as follows. When the driving source 10 is driven to rotate the timing belt 12 in the counter-clockwise direction, the left-and-right-hand threaded ball threads 17 are also driven through the timing pulley 11a and the timing pulleys 11b. As a result, the front annular link 16a and the rear annular link 16b moves simultaneously toward the center, such that the parallelograms consisting of the upper bar-shaped links 15a and the lower bar-shaped links 15b are deformed into a vertically oblong form, thereby pushing down the right horizontal connecting bar member 5a and the left horizontal connecting bar member 5b. Thus, the front tie-bars 3a and the rear tie-bars 3b are translated downward, sliding through the middle platen 2. The movable platen 4 and the upper metallic mold 7 fixed on the front tie bars 3a and the rear tie-bars 3b are thus lowered until the upper metallic mold 7 comes into contact with the lower metallic mold 6 upon the middle platen 2. The elongations of the tie-bars 3a and 3b, indicating the clamping force exerted between the upper metallic mold 7 and the lower metallic mold 6, are measured by means of the linear scales 18a and 18b. When a predetermined clamping force is attained, the driving source 10 is stopped and downward movement of the upper metallic mold 7 is halted.

Then, the semiconductor element accommodated within the cavity formed between the upper metallic mold 7 and the lower metallic mold 6 is sealed with a resin. When the resin sealing is completed, the timing belt 12 is rotated clockwise by the driving source 10. As a result, the front annular link 16a and the rear annular link 16b moves outward to deform the parallelograms consisting of the upper bar-shaped links 15a and the lower bar-shaped links 15b into a horizontally oblong form. Thus, the horizontal connecting bar members 5a and 5b move upward and thereby lift the movable platen 4 and the upper metallic mold 7 through the intermediary of the tie-bars 3a and 3b to their original positions.

Figure 3:
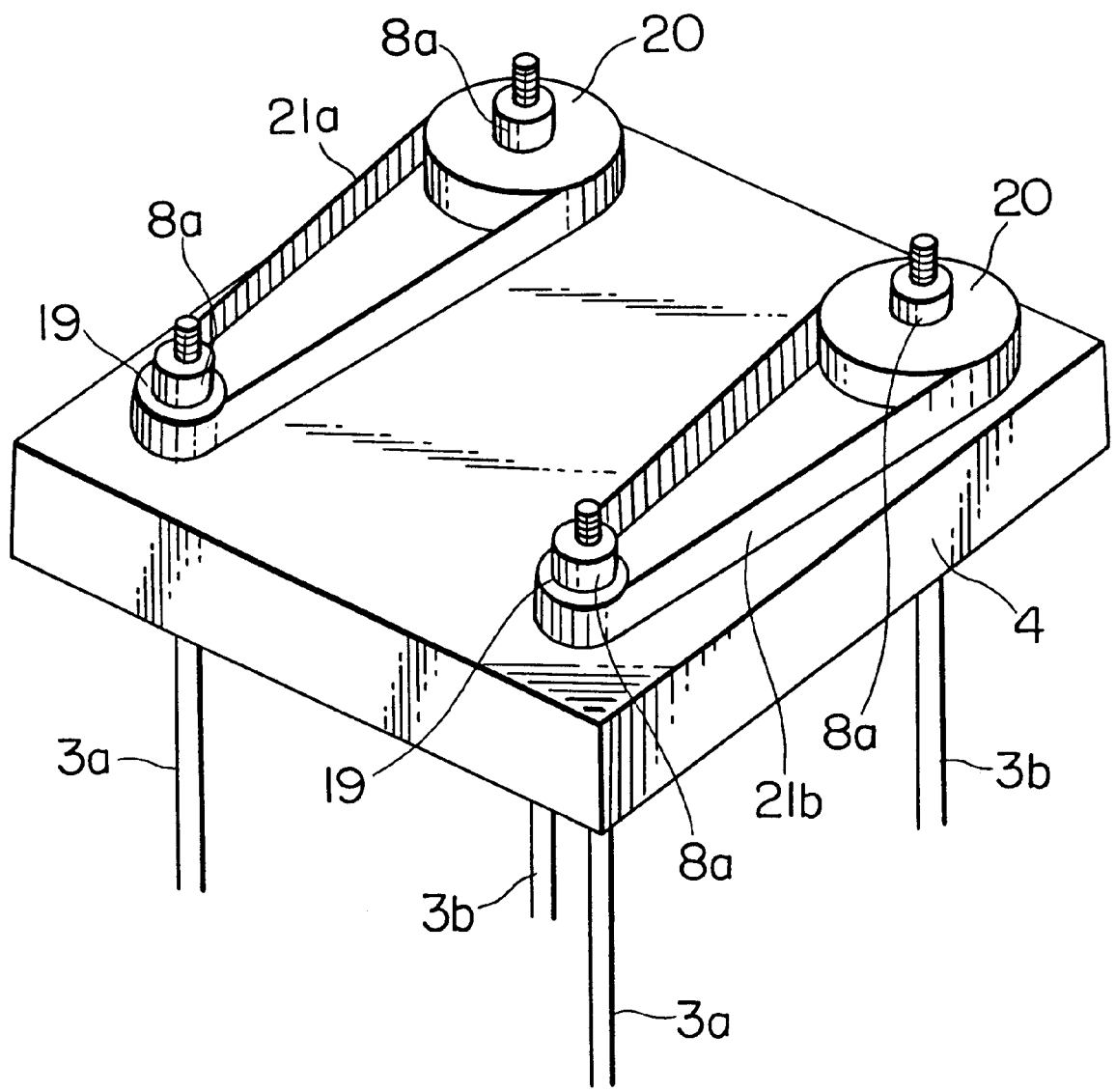
FIG. 3 is a perspective view of a fine adjustment mechanism according to this invention, which adjusts the mold face bearing (the contact force distribution) between the the lower and the upper metallic molds.
Figure 4:
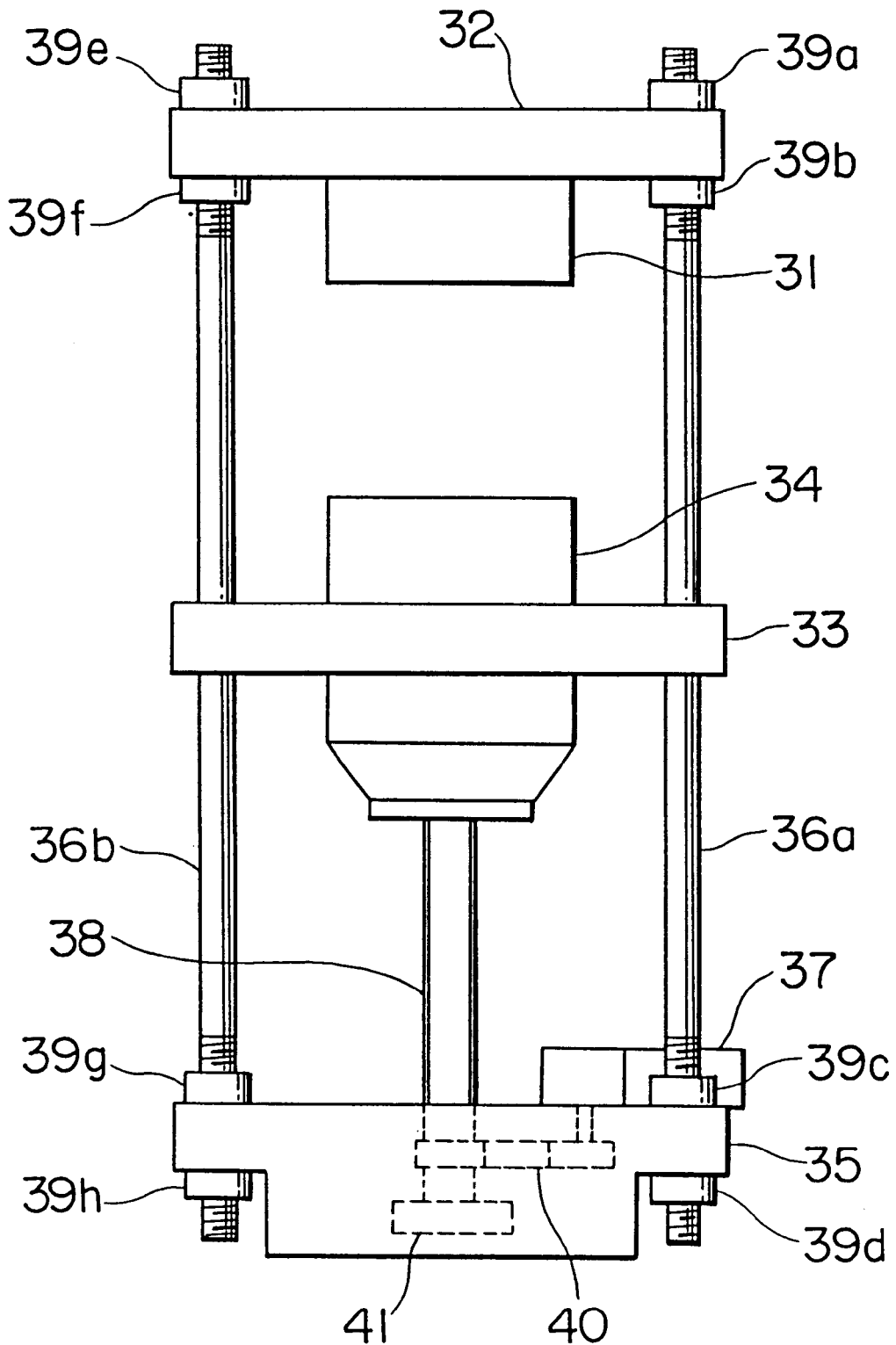
FIG. 4 is a side view of a conventional mold clamping device.

FIG. 3 is a perspective view of a fine adjustment mechanism according to this invention, which adjusts the mold face bearing (the contact force distribution) between the lower and the upper metallic molds. The fine adjustment mechanism of FIG. 3 may be provided upon the top of the movable platen 4 of the mold clamping device similar to that shown in FIGS. 1 and 2.

The tie-bars 3a and 3b engage with respective tie-bar fixing nuts 8a which supports the movable platen 4 at a height. For example, each of the tie-bar fixing nuts 8a extends rotatably through the movable platen 4 and supports the movable platen 4 upon a flange formed at the bottom end thereof extending out of the lower surface of the movable platen 4. Thus, by turning the tie-bar fixing nuts 8a by different degrees, the horizontal tilting of the movable platen 4 can be adjusted. The fine adjustment mechanism of FIG. 3 is designed for easier adjustment of the front/rear tilting of the movable platen 4.

The fine adjustment mechanism consists of two front timing pulleys 19, two rear timing pulleys 20, and a left timing belt 21a and a right timing belt 21b. The front timing pulleys 19 and the rear timing pulleys 20, slidably bearing upon the upper surface of the movable platen 4, are fixedly secured to the front and the rear tie-bar fixing nuts 8a, respectively. A left timing belt 21a is spanned on and engage with the left pair of pulleys 19 and 20. Similarly, a right timing belt 21b is spanned on and engage with the right pair of pulleys 19 and 20. The number of teeth around the front timing pulleys 19 engaging with the teeth formed upon the inner surface of the timing belts 21a and 21b is different from the number of teeth formed around the rear timing pulleys 20. Thus, by turning the front timing pulleys 19 and the rear timing pulleys 20 by means of the left timing belt 21a and the right timing belt 21b, respectively, the front/rear tilting of the movable platen 4 can be adjusted, and the fine adjustment of the mold face bearing between the upper metallic mold 7 and the lower metallic mold 6 can be effected easily.

What is claimed is:

1. A mold clamping device for sealing a semiconductor element with a resin, comprising:

a support base;

a middle platen fixedly supported by said support base;

a lower metallic mold fixedly secured upon an upper surface of said middle platen;

a plurality of tie-bars vertically extending through and slidably supported by said middle platen;

a moveable platen fixedly secured to top end portions of said tie-bars;

a member disposed beneath a lower surface of said movable platen, said member being thicker in the vertical direction at the center of said member than at the edges of said member;

an upper metallic mold disposed beneath said member to oppose said lower metallic mold, said lower metallic mold and said upper metallic mold defining a cavity for accommodating a semiconductor element during a resin molding and sealing process;

a horizontal connecting bar member connecting lower ends of at least two of said tie-bars;

a quadrilateral linkage mechanism defining a pantograph having a form of a collapsible rhombus lying on a vertical plane;

a first and second annular link rotatably coupled to said quadrilateral linkage mechanism, respectively, said first and said second annular links each having an inner thread formed on an inner surface thereof;

a rod-shaped threaded member having a left-handed first thread and a right-handed second thread formed at an outer side surface thereof, said first and second threads engaging with said inner thread of said first and said second annular links, respectively, whereby rotation of said rod-shaped threaded member in a first direction drives said annular links toward each other upon said rod-shaped threaded member, and rotation of said rod-shaped threaded member in a second direction opposite to said first direction drives said annular links away from each other upon said rod-shaped threaded member; and a driving means for driving said rod-shaped threaded member selectively in and said first and said second directions, thereby lowering said upper metallic mold toward said lower metallic mold and raiding said upper metallic mold away from said lower metallic mold, respectively, a driving force being transmitted from said driving means to said upper metallic mold through said rod-shaped threaded member, said annular links, said quadrilateral linkage mechanism, said horizontal connecting bar member, said tie-bars, and said movable platen.

2. The mold clamping device as claimed in claim 1, wherein said annular links engage with said rod-shaped threaded member via ball threads formed upon said outer side surface thereof.

3. The mold clamping device as claimed in claim 1, further comprising:

linear scales disposed a predetermined distance from and parallel to said tie-bars, wherein elongations of said tie-bars indicative of clamping forces upon contact of said lower metallic mold with said upper metallic mold are measured by means of said linear scales.

4. The mold clamping device as claimed in claim 2, further comprising:

linear scales disposed a predetermined distance from and parallel to said tie-bars, wherein elongations of said tie bars indicative of clamping forces upon contact of said lower metallic mold with said upper metallic mold are measured by means of said linear scales.

5. The mold clamping device as claimed in claim 1, further comprising:

a first and a second tie-bar fixing nut engaging with an upper end portion of a first and a second of said tie-bars, respectively, and supporting said movable platen at respective vertical levels, wherein said respective vertical levels of said movable platen are adjusted by turning said tie-bar fixing nuts;

a first and a second pulley fixedly secured to said first and said second tie-bar fixing nuts, respectively, said first and second pulleys having first and second numbers of teeth, respectively, formed on outer side surfaces thereof, wherein said first number is not equal to said second number; and a timing belt spanning said first and second pulleys, said timing belt having teeth formed upon an inner surface thereof engaging with said teeth formed on said outer side surfaces of said first and said second pulleys, such that said first and said second pulleys are turned together by means of said timing belt, to adjust a tilting of said movable platen, thereby adjusting a mold face bearing between said lower metallic mold and said upper metallic mold.

6. The mold clamping device as claimed in claim 2, further comprising:

a first and a second tie-bar fixing nut engaging with an upper end portion of a first and a second of said tie-bars, respectively, and supporting said movable platen at respective vertical levels, wherein said respective vertical levels of said movable platen are adjusted by turning said tie-bar fixing nuts;

a first and a second pulley fixedly secured to said first and said second tie-bar fixing nuts, respectively, said first and second pulleys having first and second numbers of teeth, respectively, formed on outer side surfaces thereof, wherein said first number is not equal to said second number; and a timing belt spanning said first and said second pulleys, said timing belt having teeth formed upon an inner surface thereof engaging with said teeth formed on said outer side surfaces of said first and said second pulleys, such that said first and said second pulleys are turned together by means of said timing belt, to adjust a tilting of said movable platen, thereby adjusting a mold face bearing between said lower metallic mold and said upper metallic mold.

7. The mold clamping device as claimed in claim 1, wherein said quadrilateral linkage mechanism, said first and second annular links, and said rod-shaped threaded member are operatively connected so as to provide a movable but rigid structure resistant to unintended warpage.

8. The mold clamping device as claimed in claim 1, wherein said rod-shaped threaded member is substantially disposed within an area defined by the outer edges of said support base and disposed above said connected bar member.

9. The mold clamping device as claimed in claim 2, wherein said driving means for driving said rod-shaped threaded member selectively in said first and said second directions comprises:

a first timing pulley operatively connected to a driven end of said rod-shaped threaded member;

a bi-directional driving source; and a driving source timing belt mechanically coupling said first pulley to said driving source, whereby said driving force is transmitted from said driving source to said upper metallic mold through said driving source timing belt, said first pulley, said rod-shaped threaded member, said annular links, said quadrilateral linkage mechanism, said horizontal connecting bar member, said tie-bars, and said movable platen.

10. The mold clamping device as claimed in claim 1, wherein said driving means comprises:

a second horizontal connecting bar member connecting lower ends of at least two additional said tie-bars;

a second quadrilateral linkage mechanism defining a second pantograph having a form of a collapsible rhombus lying on a vertical plane;

a third and a fourth annular link rotatably coupled to said second quadrilateral linkage mechanism, respectively, said third and said fourth annular links each having an inner thread formed on an inner surface thereof;

a second rod-shaped threaded member having a left-handed third thread and a right-handed fourth thread formed at an outer side surface thereof, said third and said fourth threads engaging with said inner thread of said third and said fourth annular links, respectively;

a first timing pulley and a second timing pulley operatively connected to respective driven ends of said rod-shaped threaded member and said second rod-shaped threaded member;

a bi-directional driving source; and a driving source timing belt mechanically coupling said first and said second pulleys to said driving source, whereby said driving force is transmitted from said driving source to said upper metallic mold through said driving source timing belt, said first and second pulleys, said rod-shaped threaded members, said annular links, said quadrilateral linkage mechanisms, said horizontal connecting bar members, said tie-bars, and said movable platen.

11. A mold clamping device for sealing a semiconductor element with a resin, comprising:

a support base;

a middle platen fixedly support by said support base;

a lower metallic mold fixedly secured upon an upper surface of said middle platen; a plurality of tie-bars vertically extending through and slidably supported by said middle platen; a movable platen fixedly secured to top end portions of said tie-bars;

an upper metallic mold fixedly secured upon a lower surface of said movable platen to oppose said lower metallic mold, said lower metallic mold and said upper metallic mold defining a cavity for accommodating a semiconductor element during a resin molding and sealing process;

a horizontal connecting bar member connecting lower ends of at least two of said tie-bars;

a quadrilateral linkage mechanism having a form of a collapsible rhombus lying on a vertical plane;

a first and second annular link rotatably coupled to said quadrilateral linkage mechanism, respectively, said first and second annular links each having an inner thread formed on an inner surface thereof;

a rod-shaped threaded member having a left-handed first thread and a right-handed second thread formed at an outer side surface thereof, said first and second threads engaging with said inner thread of said first and said second annular links, respectively, whereby rotation of said rod-shaped threaded member is a first direction drives said annular links toward each other upon said rod-shaped threaded member, and rotation of said rod-shaped threaded member in a second direction opposite to said first direction drives said annular links away from each other upon said rod-shaped threaded member;

a driving means for driving said rod-shaped threaded member selectively in said first and said second directions, thereby lowering said upper metallic mold toward said lower metallic mold and raising said upper metallic mold away from said lower metallic mold, respectively, a driving force being transmitted from said driving means to said upper metallic mold through said rod-shaped threaded member, said annular links, said quadrilateral linkage mechanism, said horizontal connecting bar member, said tie-bars, and said movable platen; and means for adjusting the tilt of said movable platen, comprising:

a first and second tie-bar fixing nut engaging with an upper end portion of a first and a second of said tie-bars, respectively, and supporting different regions of said movable platen at respective vertical levels, wherein said respective vertical levels of said movable platen regions are adjusted by turning said tie-bar fixing nuts;

a first and second pulley fixedly secured to said first and said second tie-bar fixing nuts, respectively; and a timing belt spanning said first and second pulleys, such that said first and said second pulleys are turned together by means of said timing belt to adjust a tilting of said movable platen thereby adjusting a mold face bearing between said lower metallic mold and said upper metallic mold.

12. The mold clamping device as claimed in claim 11, wherein said annular links engage with said rod-shaped threaded member via ball threads formed upon said outer side surface thereof.

13. The mold clamping device as claimed in claim 11, wherein said quadrilateral linkage mechanism, said first and second annular links, and said rod-shaped threaded member are operatively connected so as to provide a movable but rigid structure resistant to unintended warpage.

14. The mold clamping device as claimed in claim 11, wherein said rod-shaped threaded member is substantially disposed within an area defined by the outer edges of said support base and disposed above said connected bar member.

* * * * *